May 30, 1950  C. A. TEA  2,509,997
TRANSMISSION MECHANISM
Filed Sept. 3, 1946  3 Sheets-Sheet 1

INVENTOR.
Clark A. Tea.
BY
Harness, Dickey & Pierce
ATTORNEYS.

May 30, 1950     C. A. TEA     2,509,997
TRANSMISSION MECHANISM
Filed Sept. 3, 1946     3 Sheets-Sheet 2
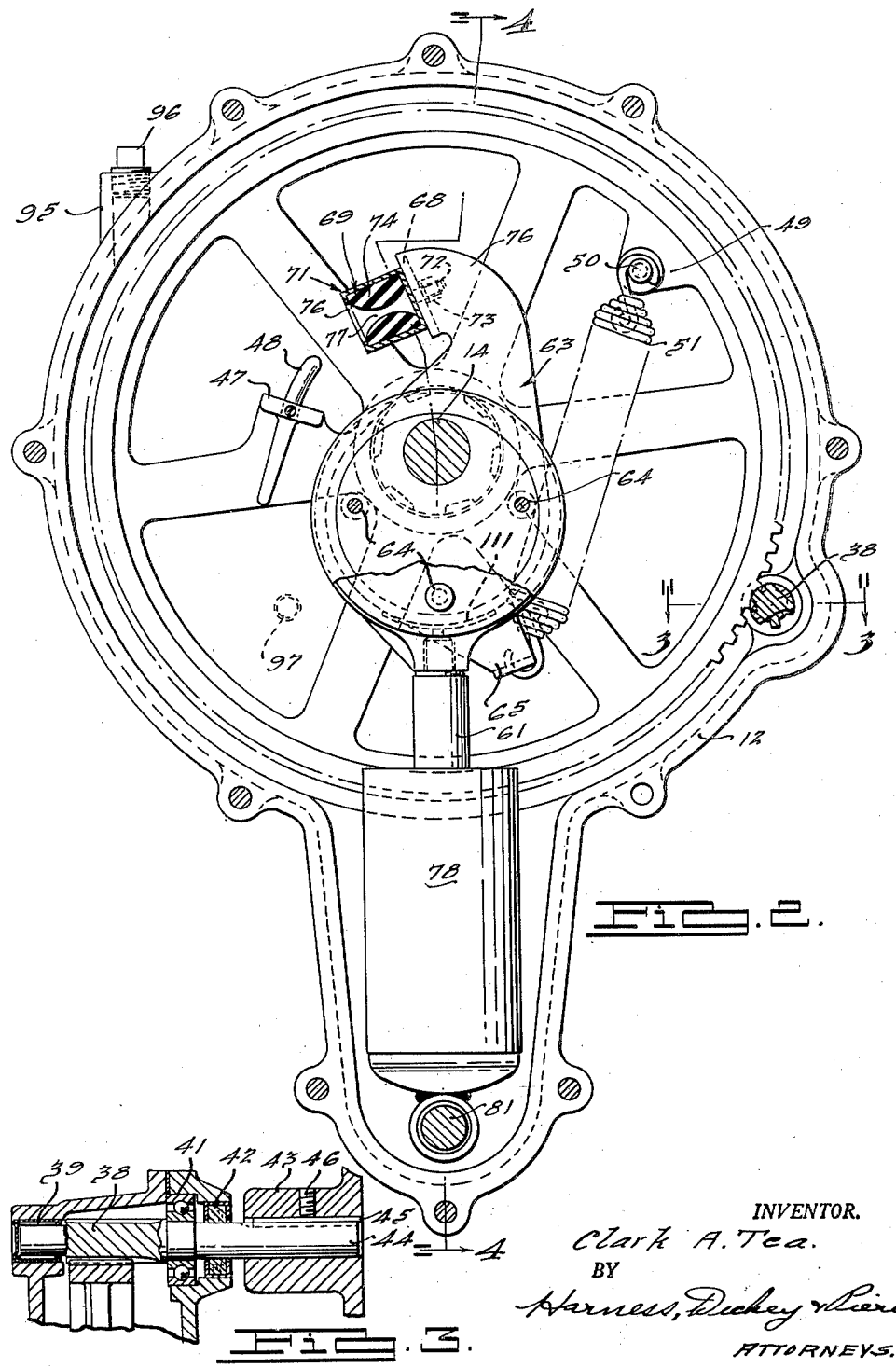
INVENTOR.
Clark A. Tea.
BY
Harness, Dickey & Pierce
ATTORNEYS.

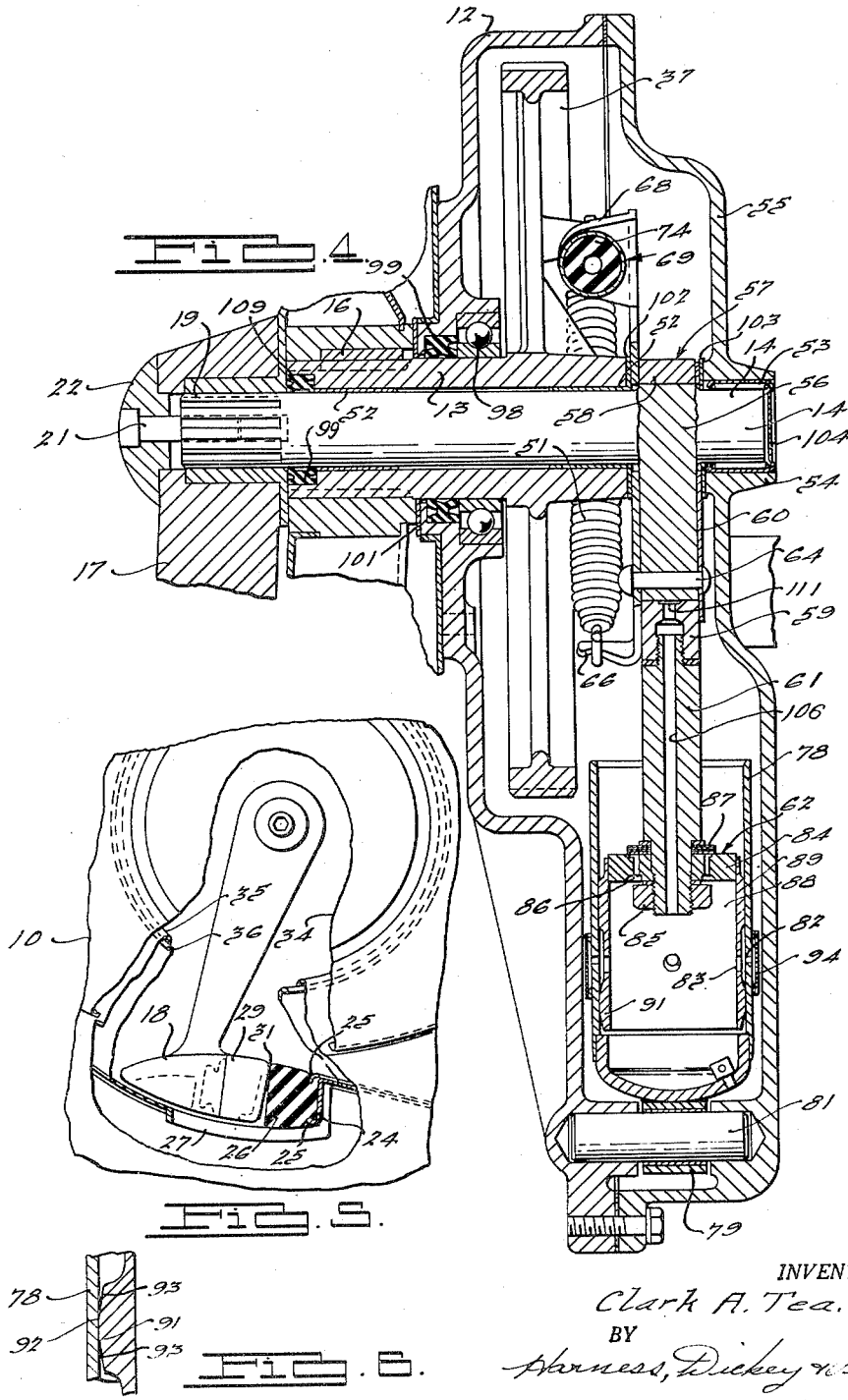

Patented May 30, 1950

2,509,997

UNITED STATES PATENT OFFICE 2,509,997

TRANSMISSION MECHANISM

Clark A. Tea, Detroit, Mich., assignor to The Murray Corporation of America, Detroit, Mich., a corporation of Delaware Application September 3, 1946, Serial No. 694,617

15 Claims. (Cl. 74—63).

This invention relates to transmissions and particularly to a transmission for a washing machine and the like.

The transmission of the present invention pertains particularly to one for operating a washing machine having a rotor driven continuously in rotation and a squeeze bar operated in rotation along therewith and in oscillation relative thereto. A washing machine for which the present transmission mechanism was invented is similar to that illustrated, described and claimed in the co-pending application of A. H. Haberstump, Serial No. 666,706, filed May 2, 1946, and assigned to the assignee of the present invention.

The washing machine comprises a cabinet or supporting legs on which a cylindrical tub is mounted with its axis disposed horizontally. Within the tub a rotor is mounted having its axis coinciding with that of the tub. Centrally of the rotor and tub, a shaft is provided on the end of which a squeeze bar is supported for rotation with the rotor and oscillation relative thereto for squeezing the clothes during the washing, rinsing and drying cycles.

The transmission mechanism is of the constant speed type, the washing machine operating at the same speed throughout the washing, rinsing and drying cycles. A housing is supported on the rear wall of the tub having journaled therein a hollow shaft with a gear secured thereto. The gear is driven from a pinion mounted on a shaft which also has a flywheel and pulley secured thereto exteriorly of the housing. The pulley is connected by a belt to a pulley on the motor for driving the shaft, pinion and flywheel for rotating the gear, the hollow shaft, and the rotor which is supported thereon. A second shaft is journaled within the hollow shaft for supporting the squeeze bar within the rotor. The shaft is provided with a cylindrical cam having its axis offset from that of the shaft and having means thereon for supporting one end of a spring, the opposite end of which is connected to the gear which drives the hollow shaft. One end of the spring is carried around by the driving gear so that the squeeze bar shaft is carried along therewith to have the squeeze bar and rotor driven in rotation while permitting relative oscillating movement therebetween.

For producing the relative oscillating movement between the central and hollow shaft, that is to say, between the rotor and the squeeze bar, a connecting rod is applied to the cam on the central shaft, having the opposite end connected to a piston which reciprocates within an open-ended cylinder having the closed end pivotally mounted within the housing. Oil or like fluid is disposed within the housing above the cylinder and pressure and relief ports are provided through the piston. Vents are provided in the piston and cylinder which are opened and closed by a portion of the piston wall for controlling the duration of maximum pressure applied through the piston and connecting rod to the squeeze bar. The piston operating within the cylinder interrupts the driving of the squeeze bar relative to the driving of the rotor. A shoulder extending inwardly from the peripheral wall will advance and carry a portion of the fabrics within the rotor against the squeeze bar with a predetermined pressure and for a predetermined length of arcuate travel of the rotor. Thereafter, the pressure within the cylinder is relieved by the passage of the portion of the wall of the piston beyond a relief port therein which relieves the cam and squeeze bar shaft from any further pressure so that the spring connected between the shaft and gear is free to return the squeeze bar to its original position spaced from the shoulder within the rotor to continue to rotate with the rotor in spaced relation with the shoulder. A suitable buffer may be provided between the two shafts for limiting the shock at the end of the separating movement between the rotor and squeeze bar.

Accordingly, the main objects of the invention are: to provide a transmission mechanism of simple construction which rotates a rotor and a squeeze bar simultaneously and in oscillation relative to each other; to provide a transmission mechanism having telescoped shafts interconnected by a spring so as to be simultaneously rotated when one of the shafts is driven and to be relatively oscillated when the other shaft has a braking load applied thereto; to provide a transmission mechanism having a pair of spring connected telescoped shafts, one of which is driven, the other of which has a cam for driving a pitman at one point in the reciprocation of which a resistance is applied which interrupts the simultaneous rotation of the shafts to produce a relative oscillation therebetween; and, in general, to provide a transmission which is simple in construction, positive in operation and economical of manufacture.

Other objects and features of novelty of the invention will be specifically pointed out or will become apparent when referring, for a better understanding of the invention, to the following description taken in conjunction with the accompanying drawings, therein:

Fig. 2 is an enlarged sectional view of the structure illustrated in Fig. 1, taken on the line 2—2 thereof;

Fig. 3 is a sectional view of the structure illustrated in Fig. 2, taken on the line 3—3 thereof;

Fig. 4 is a sectional view of the structure illustrated in Fig. 2, taken on the line 4—4 thereof;

Fig. 5 is a broken front view, with parts in section, of the washing machine illustrated in Fig. 1, and Fig. 6 is an enlarged broken view of a portion of the structure illustrated in Fig. 4.

Figure 1:
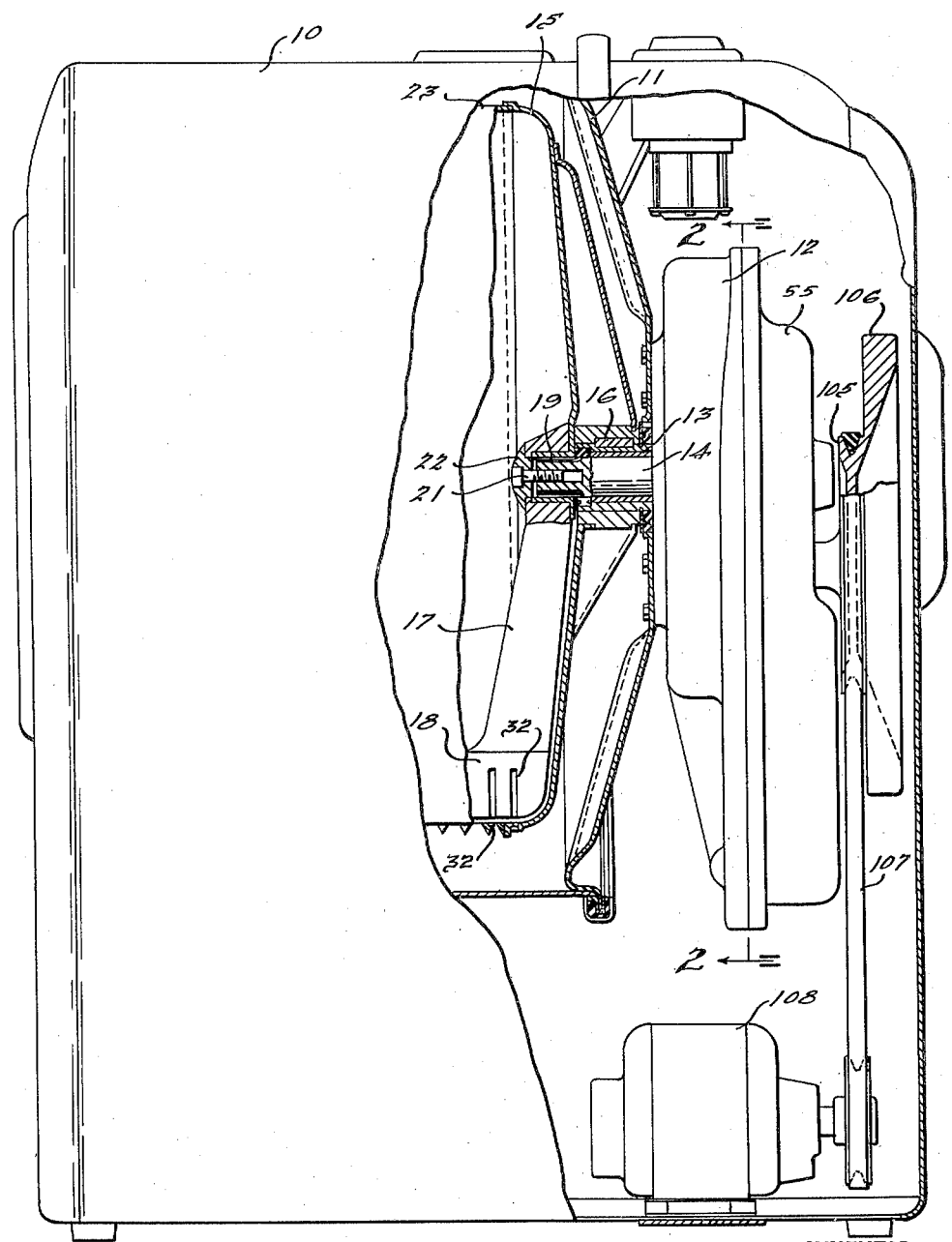
Figure 1 is a broken view in side elevation, with parts in section, of a washing machine having a transmission mechanism thereon embodying features of this invention.

Referring more particularly to Figs. 1 and 5, the transmission mechanism of the present invention is illustrated as being applied to a washing machine which embodies a cabinet 10 having a tub 11 mounted therein with its axis disposed horizontally. A housing 12 of the transmission is secured to the rear wall of the tub 11 by suitable means herein illustrated as by a plurality of screws. Projecting from the rear face of the housing is a hollow shaft 13 in which a central shaft 14 is journaled. A rotor 15, in which the fabrics are washed, is mounted on the hollow shaft 13 by a spline or key connection 16, while an arm 17 of a squeeze bar 18 is secured to the end of a central shaft 14 through a spline connection 19 by an end screw 21 extending through an end cap 22. The peripheral wall 23 of the rotor 15 is provided with an inwardly projecting shoulder 24 extending between the end walls thereof, having flanges 25 projecting inwardly toward each other for engaging and supporting a resilient squeeze element 26. Spaced plates 27 are disposed within the squeeze area between the squeeze bar and squeeze element 26 in which the water squeezed from the fabrics may pass from the rotor into the tub. The squeeze bar 18 in a similar manner has a resilient squeeze element 29 thereon which is positioned to engage the fabrics and press them against the squeeze element 26. The squeeze elements 26 and 29 are so located as to have the outer ends engage each other as at 31 to force the water being squeezed from the fabrics downwardly to the passageways between the plates 27. The face of one or both of the squeeze elements may be provided with a plurality of recesses 32 for receiving the water being squeezed from the fabrics which will pass downwardly therein and through the passageway 27 between the plates.

The front face of the cabinet 10 is provided with a door which has, when closed, a sealing relation with an opening in the tub which is aligned with an opening in the rotor. When the door is opened, the fabrics may be passed through the opening in the tub into the rotor, after which the door is closed in sealing relation with the opening in the tub to prevent the water from being splashed therefrom during the cycles of operation on the fabrics.

Referring more particularly to Figs. 2, 3 and 4, the transmission mechanism embodies a gear 37 which is a part of, or which may be removably secured to, the hollow shaft 13. The teeth of the gear 37 engage the teeth of a pinion 38, the shaft 44 of which is mounted on a needle bearing 39 and a roller bearing 41 on opposite walls of the housing in sealed relation thereto by a sealing ring 42. The hub 43 of the pulley and flywheel is secured to the projecting end of the pinion shaft 44, being secured thereto by a key 45 which is retained in position by a setscrew 46. The gear 37 has a ledge 47 extending from one of the spokes thereof, having threaded or otherwise secured thereon a plunger 48. The gear 37 is also provided with a boss 49 having a notched pin 50 projecting therefrom for receiving one end of a coil spring 51.

The shaft 14 is journaled within the hollow shaft 13 on bearings 52 and is also provided with an outboard needle bearing 53 journaled in a boss 54 on the removable cover 55 of the housing 12. A circular cam 56 is provided on the shaft 14 having its center offset from the center of the shaft. A connecting rod 57 has a ring 58 secured over the cam 56 and has a projecting arm portion 59 which is threaded to receive the threaded end of the rod 61 which has on the end thereof a piston 62. Plates 60 and 63 are secured to the circular cam 56 by suitable means, herein illustrated as by rivets 64, to retain the ring 58 of the connecting rod 57 aligned therewith. The plate 63 has a projecting finger 65 flanged outwardly at 66 for receiving the opposite end of the spring 51. Diametrically opposite to the finger 65, a flange 68 projects from the plate 63 on which a buffer element 69 is secured. The buffer element embodies a cylinder 71 having a stud 72 extending therefrom and through an aperture in the flange 68 to which it is secured by a nut 73.

A resilient annular element 74 is retained within the cylinder 71 by the inturned flange 76 about the outer edge of the cylinder. A restricted aperture 77 is formed by the resilient element 74 which produces a buffing action when the buffing element is moved over the plunger 48, which occurs when the squeeze bar 18 is separated from the shoulder 24 of the rotor. This cushions the squeeze bar at the end of its opening movement and eliminates the shock and bounce which would otherwise occur thereto.

It is to be understood that during the operation of the machine the buffing element 69 will be immersed in the oil within the housing, and the restriction to the escape of this oil produced by the projection of the plunger 48 into the element 74 produces the complete buffing of the squeeze bar at the end of its opening movement. This opening movement is produced by the tension in the spring 51 after the squeeze operation of the squeeze bar upon the fabrics within the rotor.

The piston 62 operates within a cylinder 78 having on the bottom closed end a bearing ring 79 which oscillates on a stub shaft 81, one end of which is secured to the housing and the opposite end of which is secured to the cover 55. The cylinder is provided with a plurality of orifices 82 medially of its ends in alignment with orifices 83 through the wall of the piston when the piston is approximately at the end of its downward stroke. The piston 62 has a head 84, provided with a central opening for receiving the end of the rod 61 on which it is secured by a nut 85. The head 84 is provided with a plurality of small apertures 86 annularly disposed about the center of the head to be covered by one or more thin disks 87 which prevent the flow of fluid through the apertures until a predetermined pressure has been attained. A cylindrical sleeve 88 extends downwardly from the head 87 having an upper area 89 in engagement with the wall of the cylinder 78 and a similar area 91 at the bottom in contact with the cylinder wall.

Referring to Fig. 6, it will be noted that the area 91 has a central portion 92 in direct engagement with the cylinder wall 78 and sloping areas 93 above and below the area 92 which cushions the closing or opening of the orifices 82 as the central portion 92 of the area 91 moves thereover. This eliminates the sudden opening and closing of the orifices and retards the building up or relieving of the pressure before and after a maximum pressure is reached. A spaced ring 94 or separate baffle plates may be provided about the outer wall of the cylinder 78, spaced from the orifices 82, for deflecting the oil passing therethrough under pressure and preventing the creation of a whistling sound which would otherwise occur each time the oil is forced through the orifices.

A boss 95 is provided at the top of the housing 12 to form a fill passageway through which oil is introduced in the housing and which is closed by a plug 96. A drain plug 97 is provided in the housing for regulating the height of oil therewithin. A ball bearing 98 is mounted between the hollow shaft 13 and the housing 12 and a seal 99 is provided between the shaft and the housing outwardly of the ball bearing and also between the shaft 13 and the central shaft 14.

Thrust washers 101, 102 and 103 are provided between the rotor hub and the housing 12, between the end of the hollow shaft and the plate 63, and between the plate 60 and the cover 55, respectively. The needle bearing 53 is mounted in a sealing cap 104 which seals the end of the shaft 14 in the end of the cover 55 of the housing. The hub 43 supports the pulley 105 which is formed thereon in unit relation with a flywheel 106. The pulley is driven by a belt 107 from a motor 108. The flywheel stores up energy during the rotation, which is expended during the squeezing of the fabrics between the squeeze bar and the shoulder of the rotor.

In operation, the motor drives the shaft 44 which drives the pinion 38 and the gear 37 for rotating the hollow shaft 13 and rotor 15 directly therewith. The spring 51 carries the shaft 14 and squeeze bar in rotation along with the rotation of the shaft 13 and rotor, when the squeeze bar is separated from the shoulder 24 of the rotor and the buffing element 69 is in contact with the plunger 48. The rotation of the shaft 14 produces a revolution of the cam 56 about the shaft center, with the resulting reciprocation of the piston 62 within the cylinder 78 once during each rotation of the rotor. As the piston is moved downwardly within the cylinder 78, the area 91 at the bottom of the piston first closes the orifices 82, which traps the oil within the piston in the lower portion of the cylinder and offers resistance to the downward movement of the piston, so that a pressure builds up opposing the rotation of the shaft 14. The movement of the shaft 14 in rotation with the rotor is interrupted so that the shoulder on the rotor advances toward the squeeze bar on the shaft 14. When the squeeze elements 26 and 29 engage each other or engage the fabric disposed therebetween so that no further relative movement can occur between the elements, the pressure will build up to a maximum amount within the piston and cylinder, regulated by the disks 87 or other valving means, so that a maximum pressure will be applied to the fabrics squeezed between the elements 26 and 29 irrespective of whether a large or small amount of the fabrics are being squeezed. The pressure is maintained upon the fabrics until the area 91 has passed downwardly over the orifices 82, after which the tension in the spring 51 moves the squeeze bar away from the shoulder to open position, with the final opening movement cushioned by the projection of the plunger 48 within the buffing element 69.

The arm 59 and the rod 61 have an aperture 109 extending therethrough communicating with a channel recess 111 provided in the ring 58 of the connecting rod 57. The ring 58 and the circular cam 56 are lubricated under pressure by the oil passing through the passageway 106 from within the piston 62 to the channel recess 111 to be in direct contact with the peripheral face of the circular cam 56. The spring 51 is sufficiently strong to rotate the circular cam 56 to retract the piston 62 from within the cylinder 78 to thereby separate the squeeze bar 18 away from the squeeze element 26 immediately after the squeeze operation upon the fabrics, that is to say, after the area 91 has passed downwardly over the orifices 82. The movement of the squeeze bar 18 to its position spaced from the squeeze element 26 is cushioned by the buffer element 69 passing over the plunger 48, as pointed out hereinabove. The maximum pressure produced by the operation of the piston 62 within the cylinder 78 occurs over a short arc of rotation of the rotor, the entire build-up and relief of the pressure consuming approximately 15° of each complete rotation of the rotor.

It will be noted that, with this construction, a maximum pressure is applied to the fabrics irrespective of the amount of fabrics being squeezed between the squeeze elements 26 and 29.

Squeeze elements force the water through the fabrics during the washing and rinsing cycles to flush out the embedded particles and to extract the major portion of the water therefrom during the drying cycle. The complete automatic operation of the machine follows that illustrated, described in detail, and claimed in the above-mentioned copending application of Alfred H. Haberstump.

Should the machine be stopped during the time the fabrics are being squeezed, the pressure on the oil would be soon relieved, permitting the spring 51 to separate the shoulder and squeeze bar, thereby releasing the fabrics. While in the present construction the spring 51 is of sufficient strength to retain the squeeze bar spaced from the shoulder when the area 91 of the pistons passes upwardly over the orifices 82, it is within the purview of the invention to provide a relief valve on the piston or cylinder to admit oil into the latter on the upstroke of the former.

What is claimed is:

1. In a transmission mechanism, a rotatable hollow shaft, a second shaft rotatable within said first shaft, means for driving said first shaft in rotation, a pitman operated by said second shaft having a piston on the end thereof, a flexible drive connection between said driving means and said second shaft, a cylinder in which said piston reciprocates, and a liquid within said piston and cylinder for applying a resistance to said pitman at a predetermined point in the cycle of reciprocation between said piston and cylinder.

2. In a transmission mechanism, a rotatable hollow shaft, a second shaft rotatable within said first shaft, means for driving said first shaft in rotation, a pitman operated by said second shaft having a piston on the end thereof, a flexible drive connection between said driving means and said second shaft, a cylinder in which said piston reciprocates, a liquid within said piston and cylinder for applying a resistance to said pitman at a predetermined point in the cycle of reciprocation between said piston and cylinder, and pressure relief means associated with the liquid within said piston and cylinder for limiting the resistance produced thereby.

3. In a transmission mechanism, a rotatable hollow shaft, a second shaft rotatable within said first shaft, means for driving said first shaft in rotation, a pitman operated by said second shaft having a piston on the end thereof, a cylinder in which said piston reciprocates, a liquid within said piston and cylinder for applying a resistance to said pitman at a predetermined point in the cycle of reciprocation between said piston and cylinder, pressure relief means associated with the liquid within said piston and cylinder for limiting the resistance produced thereby, and spring means connected between said shafts for producing simultaneous rotation thereof through the driving of the first said shaft while permitting oscillation therebetween when pressure is applied to the second said shaft by the resistance on said pitman.

4. In a transmission mechanism, a rotatable hollow shaft, a second shaft rotatable within said first shaft, means for driving said first shaft in rotation, a pitman operated by said second shaft having a piston on the end thereof, a cylinder in which said piston reciprocates, a liquid within said piston and cylinder for applying a resistance to said pitman at a predetermined point in the cycle of reciprocation between said piston and cylinder, pressure relief means associated with the liquid within said piston and cylinder for limiting the resistance produced thereby, spring means connected between said shafts for producing simultaneous rotation thereof through the driving of the first said shaft while permitting oscillation therebetween when pressure is applied to the second said shaft by said pitman, and a flywheel driven by the resistance on said driving means.

5. In a transmission, a housing, a hollow shaft, bearing means for supporting said shaft within said housing, a shaft journaled within said hollow shaft, a gear for driving said hollow shaft, a pinion on a shaft journaled in said housing for driving said gear, a pulley and flywheel on said pinion shaft, a piston on the end of the pitman, an oscillatable cylinder in which said piston reciprocates, a liquid within said housing covering said piston and cylinder, orifices through the walls of the cylinder and piston for porting the liquid therethrough, and a projection on said piston for covering and uncovering the orifices through said cylinder for building up a resistance on said pitman at a predetermined point in the piston's reciprocation.

6. In a transmission, a housing, a hollow shaft, bearing means for supporting said shaft within said housing, a shaft journaled within said hollow shaft, a gear for driving said hollow shaft, a pinion on a shaft journaled in said housing for driving said gear, a pulley and flywheel on said pinion shaft, a pitman operated by said second shaft, a piston on the end of the pitman, an oscillatable cylinder in which said piston reciprocates, a liquid within said housing covering said piston and cylinder, orifices through the walls of the cylinder and piston for porting the liquid therethrough, a projection on said piston for covering and uncovering the orifices through said cylinder for building up a resistance on said pitman at a predetermined point in the piston's reciprocation, said projection being slightly tapered at least at one edge for cushioning the closing and opening of said orifices.

7. In a transmission, a housing, a hollow shaft, bearing means for supporting said shaft within said housing, a shaft journaled within said hollow shaft, a gear for driving said hollow shaft, a pinion on a shaft journaled in said housing for driving said gear, a pulley and flywheel on said pinion shaft, a pitman operated by said second shaft, a piston on the end of the pitman, an oscillatable cylinder in which said piston reciprocates, a liquid within said housing covering said piston and cylinder, orifices through the walls of the cylinder and piston for porting the liquid therethrough, a projection on said piston for covering and uncovering the orifices through said cylinder for building up a resistance on said pitman at a predetermined point in the piston's reciprocation, said projection being slightly tapered at least at one edge for cushioning the closing and opening of said orifices, and pressure relief means provided for the liquid within the piston and cylinder for limiting the resistance built up thereon.

8. In a transmission, a housing, a hollow shaft, bearing means for supporting said shaft within said housing, a shaft journaled within said hollow shaft, a gear for driving said hollow shaft, a pinion on a shaft journaled in said housing for driving said gear, a pulley and flywheel on said pinion shaft, a pitman operated by said second shaft, a piston on the end of the pitman, an oscillatable cylinder in which said piston reciprocates, a liquid within said housing covering said piston and cylinder, orifices through the walls of the cylinder and piston for porting the liquid therethrough, a projection on said piston for covering and uncovering the orifices through said cylinder for building up a resistance on said pitman at a predetermined point in the piston's reciprocation, said projection being slightly tapered at least at one edge for cushioning the closing and opening of said orifices, pressure relief means provided for the liquid within the piston and cylinder for limiting the resistance built up thereon, and buffer means disposed between said two shafts in engagement when in simultaneous driving relation with each other for cushioning the shock otherwise produced at the end of the relative oscillation between the two shafts.

9. In a transmission, a housing, a hollow shaft, bearing means for supporting said shaft within said housing, a shaft journaled within said hollow shaft, a gear for driving said hollow shaft, a pinion on a shaft journaled in said housing from driving said gear, a pulley and flywheel on said pinion shaft, a pitman operated by said second shaft, a piston on the end of the pitman, an oscillatable cylinder in which said piston reciprocates, a liquid within said housing covering said piston and cylinder, orifices through the walls of the cylinder and piston for porting the liquid therethrough, a projection on said piston for covering and uncovering the orifices through said cylinder for building up resistance on said pitman at a predetermined point in the piston's reciprocation, said projection being slightly tapered at least at one edge for cushioning the closing and opening of said orifices, pressure relief means provided for the liquid within the piston and cylinder for limiting the resistance built up thereon, buffer means disposed between said two shafts in engagement when in simultaneous driving relation with each other for cushioning the shock otherwise produced at the end of the relative oscillation between the two shafts, and spring means interconnecting said two shafts which produce a simultaneous driving of the shafts through the driving of the hollow shaft and permits the relative oscillating movement therebetween.

10. In a transmission, a housing, a hollow shaft, bearing means for supporting the hollow shaft in said housing, a gear for driving said hollow shaft, a pinion for driving said gear, a second shaft journaled within said hollow shaft, spring means interconnecting the two shafts for producing the simultaneous driving thereof while permitting relative oscillation therebetween, an eccentric on said second shaft, a pitman having a bearing strap encompassing said eccentric, and means for applying a predetermined resistance on said pitman at a predetermined point in its movement.

11. In a transmission, a housing, a hollow shaft, bearing means for supporting the hollow shaft in said housing, a gear for driving said hollow shaft, a pinion for driving said gear, a second shaft journaled within said hollow shaft, spring means interconnecting the two shafts for producing the simultaneous driving thereof while permitting relative oscillation therebetween, an eccentric on said second shaft, a pitman having a bearing strap encompassing said eccentric, a piston on said pitman, an oscillatable cylinder in which said piston reciprocates, orifices extending through the walls of the piston and cylinder, and an annular projection on the wall of the piston for covering and uncovering the orifices in the cylinder wall for producing a resistance on the pitman at a predetermined point in the reciprocation of the piston.

12. In a transmission, a housing, a hollow shaft, bearing means for supporting the hollow shaft in said housing, a gear for driving said hollow shaft, a pinion for driving said gear, a second shaft journaled within said hollow shaft, spring means interconnecting the two shafts for producing the simultaneous driving thereof while permitting relative oscillation therebetween, an eccentric on said second shaft, a pitman having a bearing strap encompassing said eccentric, a piston on said pitman, an oscillatable cylinder in which said piston reciprocates, orifices extending through the walls of the piston and cylinder, a projection on the wall of the piston for covering and uncovering the orifices in the cylinder wall for producing a resistance on the pitman at a predetermined point in the reciprocation of the piston, and means in communication with the liquid in the piston and cylinder for limiting the resistance to the piston movement.

13. In a transmission mechanism, a housing, a hollow shaft, bearing means for supporting the hollow shaft in said housing, a gear for driving said hollow shaft, a pinion for driving said gear, a second shaft journaled within said hollow shaft, spring means interconnecting the two shafts for producing the simultaneous driving thereof while permitting relative oscillation therebetween, an eccentric on said second shaft, a pitman having a bearing strap encompassing said eccentric, means for applying a predetermined resistance to said pitman at a predetermined point in its movement, said means embodying a piston and cylinder operating within oil contained within said housing, said pitman having a passageway therethrough for admitting oil under pressure from said cylinder to said eccentric surface for lubricating said surface.

14. In a transmission mechanism, a housing, a hollow shaft, bearing means for supporting the hollow shaft in said housing, a gear for driving said hollow shaft, a pinion for driving said gear, a second shaft journaled within said hollow shaft, spring means interconnecting the two shafts for producing the simultaneous driving thereof while permitting relative oscillation therebetween, an eccentric on said second shaft, a pitman having a bearing strap encompassing said eccentric, means in the path of movement of said pitman to provide a resistance to such movement, and buffing means for cushioning the two shafts after relative movement in oscillation occurs therebetween.

15. In a transmission mechanism, a housing, a hollow shaft, bearing means for supporting the hollow shaft in said housing, a gear for driving said hollow shaft, a pinion for driving said gear, a second shaft journaled within said hollow shaft, spring means interconnecting the two shafts for producing the simultaneous driving thereof while permitting relative oscillation therebetween, an eccentric on said second shaft, a pitman having a bearing strap encompassing said eccentric, means in the path of movement of said pitman to provide a resistance to such movement, and buffing means for cushioning the two shafts after relative movement in oscillation occurs therebetween, said buffing means embodying a cup-like element having an inner resilient surface and a plunger projectable therein, the element and plunger being carried by the two shafts, respectively.

CLARK A. TEA.

REFERENCES CITED

The following references are of record in the file of this patent:

UNITED STATES PATENTS

| Number | Name | Date |
| --- | --- | --- |
| 14,352 | Everett | Mar. 4, 1856 |
| 227,967 | Downing | May 25, 1880 |
| 708,455 | Blake | Sept. 2, 1902 |
| 1,133,992 | Mayfields | Mar. 30, 1915 |
| 1,936,853 | Ofeldt | Nov. 28, 1933 |
| 2,073,866 | Edwards | Mar. 16, 1937 |